United States Patent Office 3,325,482
Patented June 13, 1967

3,325,482
PROCESS FOR THE PREPARATION OF 3-ACYL-AMINO-5-PYRAZOLONES AND 3-UREIDO-5-PYRAZOLONES
Marcel Jacob Monbaliu and Arthur Henri De Cat, Mortsel-Antwerp, and Raphael Karel Van Poucke, Mechlin, Belgium, assignors to Gevaert Photo-Producten N.V., Mortsel-Antwerp, Belgium, a company of Belgium
No Drawing. Filed Oct. 8, 1963, Ser. No. 314,594
9 Claims. (Cl. 260—239.7)

This invention relates to a process for the preparation of 3-acylamino-5-pyrazolones and 3-ureido-5-pyrazolones.

The preparation of 3-acylamino-5-pyrazolone derivatives and their use as magenta color couplers in silver halide photography are known from the U.S. patent specification 2,369,439. Acylation of the pyrazolone intermediate is carried out by heating the 3-amino-5-pyrazolones with acid chlorides or acid anhydrides with or without solvent and with or without condensing agent at a temperature ranging from 100 to 160° C. It is known that such a condensation reaction often proceeds with side-reactions. Acylation may take place not only on the 3-amino group but also, and in addition thereto, on the hydroxyl group of the enolized pyrazolone compound, as described i.a. in the British patent specification 680,488 and by A. Weissberger, H. D. Porter, W. A. Gregory, J. Am. Chem. Soc., 66, 1854 (1944).

The disadvantages of this diacylation are:
(1) The need of 2 moles of carboxylic acid chloride for 1 mole of 3-amino-5-pyrazolone and
(2) An additional reaction step, viz. the hydrolysis of the 5-acyloxy group in order to obtain the desired 3-acylamino-5-pyrazolone compound.

In addition to these disadvantages of the known acylation methods, there should be stated that in many cases the condensation of carboxylic acid chlorides with 3-amino-5-pyrazolones requires prolonged reaction times because of the low reactivity of the 3-amino group. With regard to the addition of 3-amino-5-pyrazolones to aromatic isocyanates, it is known that in most cases very poor yields are obtained. So, the addition of 1-phenyl-3-amino-5-pyrazolone to phenyl isocyanate, as described by A. Weissberger and H. D. Porter, J. Am. Chem. Soc., 64, 2136 (1942), hardly yields 28% of purified product.

Nothing at all is known about the addition of 3-amino-5-pyrazolones to aliphatic isocyanates. According to A. C. Farthing, Proc. Chem. Soc. (1957) 301, the aliphatic isocyanates are much less reactive than the aromatic ones. In this respect it has been experienced that the usual methods for the preparation of 3-alkylureido-5-pyrazolones failed.

It is an object of the present invention to provide a new method for the reaction of carboxylic acid chlorides or acid anhydrides with 3-amino-5-pyrazolones, and also a new method for the addition of 3-amino-5-pyrazolones to organic isocyanates or isothiocyanates.

More particularly it is an object of this invention to provide an improved method for preparing 3-acylamino-5-pyrazolones and 3-ureido-5-pyrazolones.

These objects are accomplished by carrying out the condensation and addition reaction of 3-amino-5-pyrazolones with acid chlorides, acid anhydrides or organic isocyanates in an anhydrous inert solvent in the presence of a Lewis acid.

A first class of compounds which can be used in accordance with the present invention includes aliphatic or alicyclic, aromatic and heterocyclic carboxylic acid chlorides and the corresponding anhydrides which may either be substituted or not.

Because of their use as magenta-forming color couplers in silver halide color photography certain 3-acylamino-5-pyrazolones with particular substitutions may be desired.

The acylation method for the preparation of 3-acylamino-5-pyrazolones according to the present invention shows many advantages over the classic processes.

Contrary to the known acylation methods, no O-acylation occurs in this new process. As a result thereof, the quantity of carboxylic acid chloride can be decreased to an equimolecular amount with respect to the corresponding 3-amino-5-pyrazolone. Furthermore, the reaction step in order to deacylate the 5-acyloxy group is avoided and the crude reaction products have already a high degree of purity.

The Lewis acid does not only protect the 5-carbonyl group against O-acylation but even activates the carboxylic acid chloride or anhydride. So, acylations which formerly were very difficult to carry out, can now be executed successfully in a short time.

Another advantage promoting the condensation reaction is the high solubility of 3-amino-5-pyrazolones in a mixture solvent—Lewis acid. The pyrazolone derivatives are often much less soluble in the common solvents. Thus, by working in a mixture nitrobenzene-aluminum chloride, e.g. the sodium salt of 1-p-sulfophenyl-3-amino-5-pyrazolone can be palmitoylated in homogeneous phase.

The general technical progress of our process consists in the easy and direct preparation of said products in a high yield and with a high degree of purity. As illustrated by the experimental part, our method is applicable to a wide range of reactants.

The following table compares the results obtained according to our methods and those described in the literature. In the given examples we used nitrobenzene as a solvent and aluminum chloride as a Lewis acid.

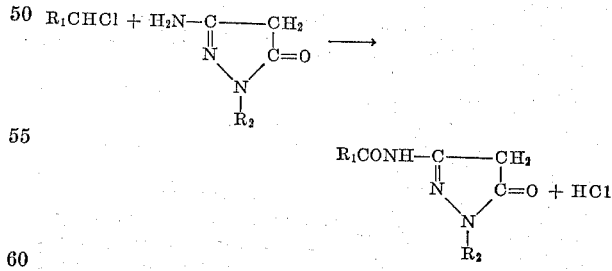

| $R_1$ | $R_2$ | $C_6H_5NO_2$—$AlCl_3$ | | Usual processes | | |
|---|---|---|---|---|---|---|
| | | Reaction time/ temperature | Yield percent | Reaction time/ temperature | Yield percent | Literature ref. |
| $C_6H_5$ | $C_6H_5$ | 10 min./50° C | 86 | 18 h./100° C | 64 | (1) |
| $C_6H_5$ | 2-benzothiazolyl | 10 min./50° C | 80.5 | 60 min./100° C | 18.5 | (2) |
| $CH_3$ | $C_6H_5$ | 10 min./50° C | 83 | 60 min./40 °C | 43 | (1) |

[1] A. Weissberger, H. D. Porter, J. Am. Chem. Soc. 64, 2133 (1942).
[2] A. Weissberger, H. D. Porter, W. A. Gregory, J. Am. Chem. Soc. 66, 1851 (1944).

A second class of compounds, which can be used in accordance with the present invention comprises organic isocyanates having the following general formula:

R—N=C=X wherein:
X is an atom selected from the group consisting of oxygen and sulfur, and
R is a radical selected from the group consisting of a linear aliphatic radical, a cyclic aliphatic radical, an aromatic radical, a substituted aromatic radical, a heterocyclic radical and a substituted heterocyclic radical, which all of them may comprise in their structure a group rendering the compound fast to diffusion, e.g. a radical containing a long aliphatic chain.

Certain substituted aliphatic, cycloaliphatic, aromatic and heterocyclic isocyanates and isothiocyanates are given in the preparations.

The preparation of 3-ureido-5-pyrazolones according to the present invention affords important advantages over the known processes.

By means of our method 3-arylureido-5-pyrazolones are obtained in very good yields by the addition of 3-amino-5-pyrazolones to the slightly reactive aromatic isocyanates. In this way we prepared 1-phenyl-3-phenylureido-5-pyrazolone in a yield of 83%. According to the usual process A. Weisberger and A. D. Porter, J. Am. Chem. Soc., 64, 2136 (1942) obtained this compound in a yield of only 28%.

A still further progress of the present invention involves the preparation of 3-alkylureido-5-pyrazolones. It is found that the aliphatic isocyanates exhibit a very low reactivity with respect to the 3-amino-5-pyrazolones, with the result that the usual methods failed to prepare 3-alkylureido-5-pyrazolones. The present invention affords a new method for preparing this type of color couplers in a good yield by addition of 3-amino-5-pyrazolones to aliphatic isocyanates in the presence of a Lewis acid and a suitable solvent. By this way, the carbamoylation is extended to all organic isocyanates.

The reaction condtons of the afore-mentoned condensation and addition reaction are determined by the nature of the solvent, the nature and the quantity of Lewis acid as catalyst as well as by the reaction temperature.

The solvents should be anhydrous and inert with respect to the reagents and the Lewis acid. I.a. the solvents used in Friedel-Crafts reactions meet these requirements, e.g. nitrobenzene tetrahydrothiophene-1,1-dioxide, nitromethane and a series of chlorinated lower aliphatc hydrocarbons such as methylene chloride, 1,2-dichloroethane and carbon tetrachloride.

Lewis acids preferably used for the activation of the afore-mentioned reactions are the usual Friedel-Crafts catalysts, which chemically can be determined as strongly cationoid metal halides (ref. Dewar, Electronic Theory of Organic Chemistry, Oxford, at the Clarendon Press (1949), p. 178). More definitely there may be cited aluminum chloride, aluminum bromide, tin(IV) chloride, antimony(V) fluoride and zinc chloride.

The choice of the Lewis acid often depends on the nature of the reagents. Especially antimony(V) fluoride appeared to be the most effective catalyst for the addition of 3-amino-5-pyrazolones to fluorosulfonylphenyl isocyanates. Such a catalyst is very important in view of the synthesis of color couplers intermediates with a fluorosulfonyl group in their structure, which enables us to prepare water-soluble color couplers.

Furthermore, antimony(V) fluoride is a selective activator for the carbamoylation of the 3-amino group in 3-amino-5-pyrazolones containing a —NHSO$_2$— group such as 1-(p-n-hexadecylaminosulfophenyl)-3-amino-5-pyrazolone. Other Lewis acids such as aluminum chloride and tin(IV) chloride also catalyze the addition of an organic isocyanate to the secondary sulfonamide group.

The amount of Lewis acid used in the condensation and addition reaction depends on the nature of the Lewis acid and the reactants involved.

In some cases the minimum amount should not be exceeded in order to protect groups, which are sensitive to Lewis acids e.g. alkoxy groups, against side-reactions.

The reaction temperature is usually not higher than the boiling point of the inert solvent and preferably comprised between 10 and 80° C. In many cases a temperature of 50° C. guarantees a fast reaction and a good yield.

When using aluminum chloride, it is found that the amount of hydrochloric acid set free in the reaction is twice the quantity to be expected from the acylation reaction. Even more unexpected is the formation of hydrochloric acid in the carbamoylation reaction.

As has been found this additional quantity of hydrochloric acid is produced by the action of aluminum chloride on the hydroxyl groups of the enolized 3-acyl- and 3-ureidopyrazolones.

The following preparations illustrate the present invention.

Part I: Preparation of 3-acylamino-5-pyrazolones.
   A. Acylation with carboxylic acid chlorides.
   B. Acylation with acid anhydrides.
Part II: Preparation of 3-ureido-5-pyrazolones.
   A. Reaction with isocyanates.
   B. Reaction with isothiocyanates.

The melting points have been determined on the Kofler hot bench.

PART I

A. *Acylation with carboxylic acid chlorides*

PREPARATION 1.—1-PHENYL-3-BENZOYLAMINO-5-PYRAZOLONE

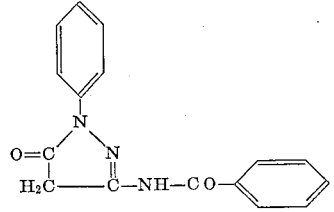

In a flask, provided with a stirrer, a thermometer and a condenser fitted with a drying tube are dissolved 8.75 g. (0.05 mole) of 1-phenyl-3-amino-5-pyrazolone and 9.22 g. (0.075 mole) of anhydrous aluminum chloride in 20 ml. of dry nitrobenzene; the temperature rises to 70° C. After cooling to room temperature 7.02 g. (0.05 mole) of benzoyl chloride is added dropwise, thus causing a vigorous liberation of hydrogen chloride. After 10 minutes the reaction mixture is poured into 1N hydrochloric acid, and the obtained sticky precipitate is filtered off and boiled with 100 ml. of methanol. Yield: 12.1 g. (86%). Melting point: 223° C.

PREPARATION 2.—1-PHENYL-3-ACETYLAMINO-5-PYRAZOLONE

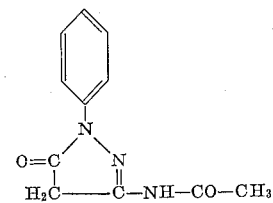

In an outfit analogous to that used in the preceding preparation 8.75 g. (0.05 mole) of 1-phenyl-3-amino-5-pyrazolone and 13.35 g. (0.1 mole) of anhydrous aluminum chloride are dissolved with stirring in 25 ml. of nitrobenzene. After cooling to 10° C., 3.95 g. (0.05 mole) of acetyl chloride is added dropwise thus causing an exothermic reaction with an intense liberation of hydrogen chloride. After 10 minutes the mixture is worked up as in the preceding preparation. Yield: 9 g. (83%). Melting point: 220° C.

PREPARATION 3.—1-(p-n-HEXADECYLSULFONYLPHENYL)-3-ACETYLAMINO-5-PYRAZOLONE

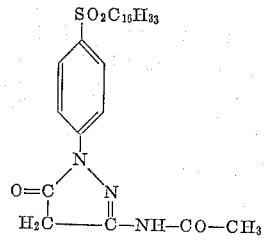

In a 100 ml. flask provided with a stirrer and a condenser with a drying tube, 9.26 g. (0.02 mole) of p-(1-n-hexadecylsulfonylphenyl)-3 - amino - 5 - pyrazolone (prepared as described in preparation 8, d) part IIA and 5.34 g. (0.04 mole) of anhydrous aluminum chloride are dissolved in 25 ml. of nitrobenzene. To the homogeneous and cooled (10° C.) mixture, 1.65 g. (0.02 mole) of acetyl chloride is added. The reaction is completed while stirring for 1 h. at room temperature. The solution is then heated for 30 minutes at 50° C. After pouring in hydrochloric acid the resulting precipitate is filtered off, boiled in 100 ml. methanol and dried. Yield: 9.1 g. (90%). Melting point: 152–154° C.

PREPARATION 4.—1-(p-n-HEXADECYLSULFONYLPHENYL)-3-CYCLOHEXANOYL-AMINO-5-PYRAZOLONE

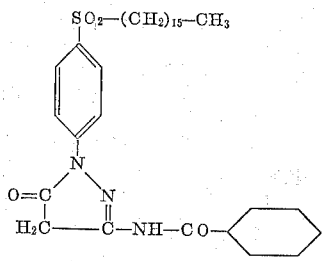

In a 100 ml. flask 9.26 g. (0.02 mole) of 1-(p-n-hexadecylsulfonylphenyl)-3-amino-5-pyrazolone and 5.25 g. (0.02 mole) of anhydrous tin(IV) chloride are dissolved in 25 ml. of nitrobenzene. To this solution 2.93 g. (0.02 mole) of cyclohexylcarboxylic acid chloride is added and the bulk is heated for 90 minutes at 50° C. The brown reaction mixture is poured into 200 ml. of 1 N hydrochloric acid and the formed precipitate is boiled in 120 ml. of methanol and filtered while hot. The residue is dried at 70° C. Yield: 7.3 g. (64%). Melting point: 189° C.

PREPARATION 5.—1-(p-n-HEXADECYLSULFONYLPHENYL)-3-(2'-THIENOYLAMINO)-5-PYRAZOLONE

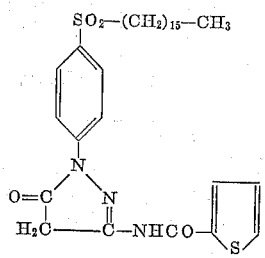

In a flask provided with a stirrer, a thermometer and a condenser fitted with a drying tube 9.26 g. (0.02 mole) of 1-(p-n-hexadecylsulfonylphenyl)-3-amino-5-pyrazolone and 5.35 g. (0.04 mole) of anhydrous aluminum chloride are dissolved in 20 ml. of nitrobenzene. At 20° C., 2.93 g. (0.02 mole) of thienoyl chloride [Buu Hoï, Rec. trav. Chim. 68, 19 (1949)] is added dropwise. The mixture is heated for 15 minutes at 50° C. whereby hydrogen chloride evolves. The reaction mixture is then poured into 200 ml. of 1 N hydrochloric acid. The grainy product is boiled in 100 ml. of methanol, the solid is filtered off and dried. Yield: 10.9 g. (95%). Melting point: 175° C.

PREPARATION 6.—1 - (p - n - HEXADECYLAMINOSULFONYLPHENYL)-3-PIVALOYLAMINO-5-PYRAZOLONE

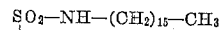
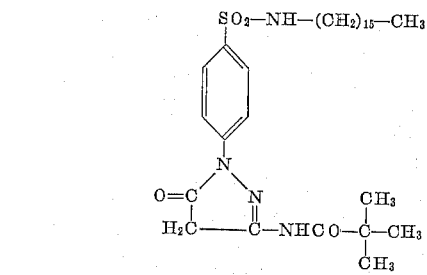

In a 100 ml. flask provided with a stirrer, a thermometer and a condenser fitted with a drying tube are brought successively 19.12 g. (0.04 mole) of 1-(p-n-hexadecylaminosulfonylphenyl)-3-amino-5-pyrazolone (prepared as described in Preparation 12c, part IIA), 4.82 g. (0.04 mole) of pivaloyl chloride, 5.4 g., 0.04 mole) of anhydrous zinc chloride and 40 ml. of nitrobenzene. The dissolution is completed by heating to 90° C. causing in this way a slight evolution of hydrogen chloride. The reaction is completed after 7 hrs. of stirring. The mixture is then poured into a mixture of 160 ml. of water and 12 ml. of concentrated hydrochloric acid, whereby a sticky precipitate is separated. After about 2 hrs. the product is filtered off, dissolved in 75 ml. of methanol and after cooling, separated and dried. Yield: 15.5 g. (69%). Melting point: 135–137° C.

PREPARATION 7.—POTASSIUM SALT OF 1-(p-SULFOPHENYL)-3-PALMITOYLAMINO-5-PYRAZOLONE

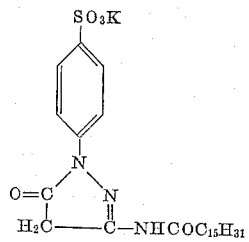

In a 100 ml. three-necked flask equipped with a stirrer, a thermometer and a condenser fitted with a drying tube 14.65 g. (0.05 mole) of the potassium salt of 1-(p-sulfophenyl)-3-amino-5-pyrazolone and 16 g. (0.12 mole) of anhydrous aluminum chloride are dissolved in 25 ml. of nitrobenzene. The temperature rises to 80° C. After cooling to 45° C., 13.75 g. (0.05 mole) of palmitoyl chloride is added. Hydrogen chloride is evolved. After stirring for 20 minutes at 30–40° C., the viscous reaction mixture is poured into water. The precipitate is filtered off and crystallized from 350 ml. of ethyleneglycol monomethylether. After cooling, a white amorphous product is collected and dried. Yield: 15.3 g. (57%).

PREPARATION 8.—1-[p-(N-HEXADECYL-N-ACETYLSULFAMOYL)-PHENYL]-3-ACETYLAMINO-5-PYRAZOLONE

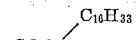
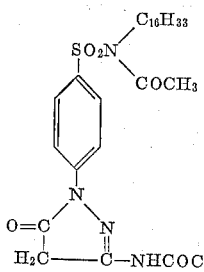

In an outfit equipped with a stirrer, a thermometer and a drying tube, 14.34 g. (0.03 mole) of 1-(p-n-hexadecylaminosulfonyl)-phenyl-3-amino-5-pyrazolone and 8 g. (0.06 mole) of anhydrous aluminum chloride are dissolved in 20 ml. of nitrobenzene. To the homogeneous solution cooled at 10° C., 4.71 g. (0.06 mole) of acetyl chloride is added dropwise. The mixture is stirred for 1 h. 50 minutes at 50° C., and poured into 300 ml. of 1 N hydrochloric acid. The formed solid is collected by filtration and recrystallized from hot methanol. Yield: 14.2 g. (84%). Melting point: 197–198° C.

PREPARATION 9.—1-(2'-BENZOTHIAZOYL)-3-BENZOYL-AMINO-5-PYRAZOLONE

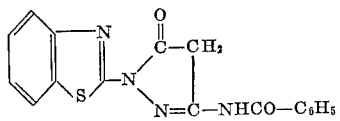

In a 100 ml. flask, provided with a stirrer, a thermometer and a condenser fitted with a drying tube, 9.28 g. (0.04 mole) of 1-(2'-benzothiazolyl)-3-amino-5-pyrazolone [A. Weissberger, H. D. Porter, W. A. Gregory, J. Am. Chem. Soc. 44, 1851 (1944)] and 10.68 g. (0.08 mole) of anhydrous aluminum chloride are dissolved in 50 ml. of nitrobenzene. The temperature rises to 65° C. After cooling to room temperature, 5.6 g. (0.4 mole) of benzoylchloride is added, thus causing an intense liberation of hydrogen chloride. After 10 minutes, the bulk is poured into 1 N hydrochloric acid. The collected solid is boiled in methanol and dried. Yield: 10.8 g. (80.5%). Melting point: 225° C.

B. Acylation with carboxylic anhydrides

PREPARATION 1.—1 - (p - n - HEXADECYLSULFONYL)-PHENYL-3-(2'-NITRO - 6' - CARBOXYBENZOYLAMINO)-5-PYRAZOLONE

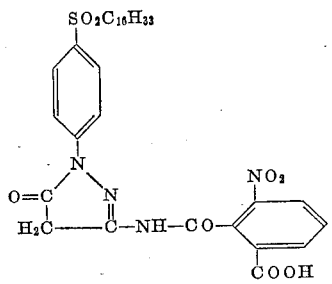

In a 100 ml. flask provided with a stirrer, a thermometer and a condenser fitted with a drying tube are brought 14.34 g. (0.03 mole) of 1-(p-n-hexadecylamino-8 g. (0.06 mole) of anyhydrous aluminum chloride, 9.26 g. (0.02 mole) of 1 - (p - n - hexadecylsulfonylphenyl)-3-amino-5-pyrazolene and 20 ml. of nitrobenzene. After 5 minutes a homogeneous solution is obtained which is heated for 3 hrs. at 40° C. The obtained viscous mass is poured into a mixture of 200 ml. of water and 10 ml. of concentrated hydrochloric acid. After cooling, the precipitate is filtered off, pressed almost to dryness and then boiled in 250 ml. of methanol. The solid is filtered off and dried at 80° C. Yield: 11.5 (87.5%). Melting point: above 260° C.

PREPARATION 2.—1 - (p - n - HEXADECYLAMINOSULFONYLPHENYL)-3-ACETYLAMINO-5-PYRAZOLONE

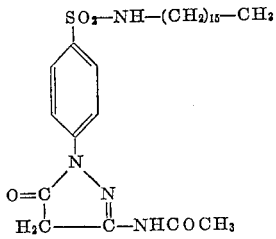

In a 100 ml. flask, provided with a stirrer, a thermometer, and a condenser fitted with a drying tube are brought 14.34 g. (0.03 mole) of 1-(p-n-hexadecylamino-sulfonylphenyl)-3-amino-5-pyrazolone, 12 g. (0.09 mole) of anyhydrous aluminum chloride and 30 ml. of dry nitrobenzene. While stirring, the temperature of the mixture rises to 40° C. Thereupon 3.06 g. (0.03 mole) of acetic anhydride is added dropwise. The solution is heated for 15 minutes at 50° C. and poured into a mixture of 120 ml. of water and 30 ml. of concentrated hydrochloric acid. The crude product is boiled with 90 ml. of methanol. The crystalline precipitate is filtered off and dried. Yield: 13.9 g. (89%). Melting point: 217–218° C.

PREPARATION 3.—1-(p-n-METHYLSULFONYLPHENYL)-3-(2'-CARBOXYNONADECANOYLAMINO) - 5 - PYRAZOLONE

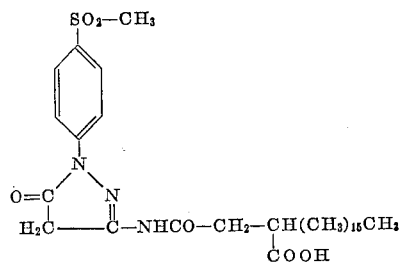

(a) 1-(p-methylsulfonylphenyl) - 3 - amino-5-pyrazolone.—37.2 g. (0.2 mole) of p-methylsulfonylphenylhydrazine (E. Koenigs and A. Wylczick, J. prakt. Chem. 132, 24 (1931) and 39.1 g. (0.2 mole) of β-ethoxy-β-amino-acrylic acid ethyl ester hydrochloride are suspended in 100 ml. of anhydrous pyridine. The temperature rises to 34° C., while a fine precipitate of ammonium chloride is formed. After stirring for 2 hours, the ammonium chloride is filtered off and the filtrate is diluted with 200 ml. of acetonitrile. A crystalline precipitate consisting of 1-carbethoxy-(1-N-methylsulfonylphenyl)-acetamidrazone hydrochloride is formed. Yield: 45 g. Melting point: 230° C. (dec.).

23.8 g. of this product is added to a solution of 13.8 g. of potassium hydroxide (85%) in 100 ml. of absolute ethanol. After stirring for 1 hour the mixture is diluted with water at room temperature and neutralized with 5 N of hydrochloric acid. The formed brownish grey precipitate is filtered off and recrystallized from dimethylformamide. Yield: 12 g. Melting point: 248–250° C.

(b) 1 - (p-methylsulfonylphenyl) - 3-(2'-carboxynonadecanoylamino)-5-pyrazolone.—In a 100 ml. flask provided with a stirrer, a thermometer and a condenser with drying tube, 10.12 g. (0.04 mole) of 1-(p-methylsulfonylphenyl)-3-amino-5-pyrazolone, 13 g. (0.04 mole) of hexadecylsuccinic anhydride and 16 g. (0.12 mole) of anhydrous aluminum chloride are dissolved while stirring in 40 ml. of nitrobenzene. The temperature rises to 60° C. The reaction mixture is further heated for 3 hours at 50° C., thus causing the formation of hydrogen chloride. The obtained viscous mass is poured into a mixture of 160 ml. of water and 12 ml. of concentrated hydrochloric acid. the solid is filtered off, washed with methanol and boiled in 150 ml. of methanol. Yield: 15.9 g. (52%). Melting point: 175° C.

PART II

A. Reaction with isocyanates

PREPARATION 1.—1-PHENYL-3-OCTADECYLCARBAMOYLAMINO-5-PYRAZOLONE

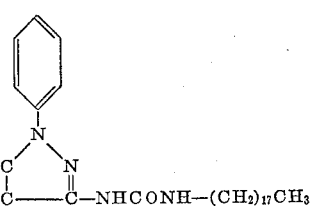

In a 500 ml. threenecked flask provided with a stirrer, a thermometer and a condenser fitted with a drying tube, 80 g. (0.06 mole) of anhydrous aluminum chloride is dissolved in 250 ml. of anhydrous methylene chloride. The solution is placed into an ice bath and 52.5 g. (0.3 mole) of 1-phenyl-3-amino-5-pyrazolone (A. Weissberger, H. D. Porter, J. Am. Chem. Soc. 64, 2133 (1942) is added portionwise. To the dark brown solution cooled at 30° C., 88.5 g. (0.3 mole) of octadecyl isocyanate is added dropwise in 30 minutes. The reaction is completed by heating the mixture for 3 hours at 40° C., whereby hydrogen chloride is liberated. Then the warm solution is poured into 2 l. of warm 1 N hydrochloric acid. The solvent evaporates and a white grainy solid is precipitated. The bulk is then heated once again to 50° C. in order to disclose the complexes entirely. The solid is filtered off and recrystallized from about 900 ml. of ethanol and dried. Yield: 113 g. (80%). Melting point: 159° C.

PREPARATION 2.—1-PHENYL - 3 - (N - OCTADECYLCARBAMOYL-N-BUTYLAMINO)-5-PYRAZOLONE

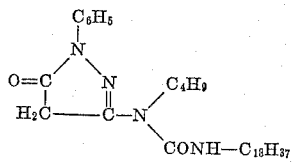

In a 100 ml. flask provided with a stirrer, a thermometer and a condenser fitted with a drying tube, 6.93 g. (0.03 mole) of 1 - phenyl-3 - butylamino - 5 - pyrazolone (British patent specification 737,692) and 8 g. (0.06 mole) of anhydrous aluminum chloride are dissolved in 25 ml. of nitrobenzene while stirring. To the light brown solution 8.75 g. (0.03 mole) of n-octadecyl isocyanate is added dropwise. After keeping the reaction mixture for 2 hours at 50° C., the solution is poured into a mixture of 200 ml. of water and 7.5 ml. of concentrated hydrochloric acid. The obtained precipitate is filtered off and recrystallized from ehanol. Yield: 10.2 g. (65%). Melting point: 89–90° C.

PREPARATION 3.—1-PHENYL-3-PHENYLUREIDO-5-PYRAZOLONE

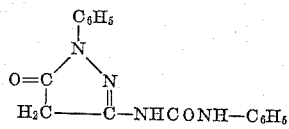

In a 100 ml. flask provided with a stirrer, a thermometer and a condenser fitted with a drying tube 8.75 g. (0.05 mole) of 1-phenyl-3-amino-5-pyrazolone and 13.5 g. (0.1 mole) of anhydrous aluminum chloride are dissolved in 25 ml. of nitrobenzene. After an exothermic complexation reaction, 6 g. (0.05 mole) of phenyl isocyanate is added. The mixture is stirred for 3 hours at 50° C. and poured into 200 ml. of 1 N hydrochloric acid. The resulting precipitate is filtered off and boiled in 100 ml. of methanol. Yield: 12.1 g. (82%). Melting point: 235° C.

PREPARATION 4.—1 - (m-n-HEXADECYLOXYPHENYL)-3-(n-BUTYLCARBAMOYLAMINO)-5-PYRAZOLONE

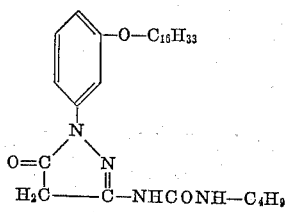

(a) *m - n - Hexadecyloxynitrobenzene.*—A solution of 17.7 g. (0.1 mole) of m-nitrophenol and 30.5 g. (0.1 mole) of n-hexadecyl bromide in 200 ml. of ethyleneglycol monomethylether is refluxed for 30 minutes while stirring. The reaction mixture is poured into 100 ml. of ice-water. Then the obtained grainy product is filtered off and recrystallized from isopropanol. Yield: 29.3 g. Melting point: 54° C.

(b) *m-n-Hexadecyloxyaniline.*—A mixture consisting of 58 g. of m-n-hexadecyloxy-nitrobenzene, 6 ml. of Raney nickel and 293 ml. of anhydrous ethanol was subjected to hydrogenation in an autoclave at 80° C. and 1500 p.s.i. of hydrogen until the theoretical amount of hydrogen was absorbed. The catalyst is removed by filtration and the filtrate is cooled. A white crystalline solid is filtered off and dried. Yield: 51.4 g. (97%). Melting point: 66° C.

(c) *m-n-Hexadecyloxyphenylhydrazine.*—To a solution of 33.3 g. of m-hexadecyloxyaniline (0.1 mole) in 350 ml. of warm acetic acid is slowly added 25 ml. of concentrated hydrogen chloride (0.3 mole). The viscous mass is cooled to 15° C. and treated with 17.5 ml. (0.13 mole) of isoamyl nitrite. After stirring for 30 minutes, a clear solution is obtained to which 1.2 g. (0.03 mole) of urea is added. After stirring for further 30 minutes, reduction is carried out at about 10° C. by adding dropwise a solution of 67.5 g. (0.22 mole) of tin (II) chloride dihydrate in 70 ml. of concentrated hydrochloric acid. After stirring for 90 minutes the reaction mixture is heated on a water bath until granulation. The product is filtered off and boiled with 500 ml. of 10 N sodium hydroxide. The formed m-hexadecyloxyphenylhydrazine is extracted with 200 ml. of hot dioxan. The dioxan layer is separated and while vigorously stirring poured into water. The solid is filtered off, dried, recrystallized from 100 ml. of hexane, and dried with shavings of paraffin wax. Yield: 19.2 g. Melting point: 68° C.

(d) *1-(m-n-hexadecyloxyphenyl)-3-amino-5 - pyrazolone.*—69.6 g. (0.2 mole) of m-n-hexadecyloxyphenylhydrazine and 43 g. (0.24 mole) of β-ethoxy-β-amino-acrylic acid ethyl ester hydrochloride are stirred at room temperature in 200 ml. of anhydrous pyridine. After 20 minutes a solution of 40 g. of potassium hydroxide (85% pure) in 200 ml. of ethanol is added. The red solution is poured after 5 minutes into 1 l. of water. Then it is neutralized with 50 ml. of acetic acid and the resulting precipitate is filtered off. The moist product is dissolved in a boiling mixture of 400 ml. of isopropyl ether and 50 ml. of benzene and the hot organic layer is separated. The product crystallizes herein and is dried. Yield: 45.3 g. Melting point: 112° C.

(e) *1-(m-n-hexadecyloxyphenyl)-3-(n-butylcarbamoylamino)-5-pyrazolone.*—In an outfit described as in Example 3, 12.45 g. (0.03 mole) of 1-(m-n-hexadecyloxyphenyl)-3-amino-5-pyrazolone and 8 g. (0.06 mole) of anhydrous aluminum chloride in 30 ml. of nitrobenzene are dissolved, whereby the temperature rises to 38° C. To the homogeneous solution is added 3.26 g. (0.03 mole, content: 91%) of n-butyl isocyanate. The solution is heated for 4 hours at 50° C., thus causing a regular evolution of hydrogen chloride. The reaction mixture is decomposed with 100 ml. of 1 N hydrochloric acid. After 1 hour the formed grainy solid is filtered off, boiled in 150 ml. of methanol and dried. Yield: 14.1 g. (92%). Melting point: 106–108° C.

PREPARATION 5.—1 - (m-n-HEXADECYLOXYPHENYL)-3-BENZYLCARBAMOYLAMINO-5-PYRAZOLONE

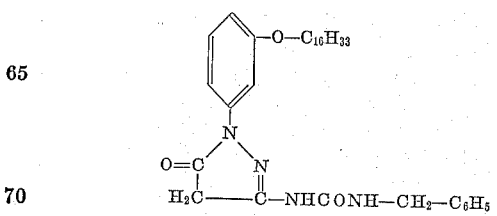

In an outfit described as in Example 2, 9.3 g. (0.02 mole) of 1-(m-n-hexadecyloxyphenyl)-3-amino-5-pyrazolone and 5.3 g. (0.04 mole) of anhydrous aluminum chloride are dissolved in 20 ml. of dry nitrobenzene. To the homogeneous solution is added dropwise 2.93 g. (0.02 mole, content 90%) of benzyl isocyanate (A. F. McKay, J. Chem. Soc. 1395 (1951)), whereby the temperature rises from 26 to 45° C. The solution is heated for 1 hour at 50° C., thus causing the evolution of hydrogen chloride. The reaction mixture is then poured into dilute hydrochloric acid and after 2 hours the granulated solid is filtered off. The product is boiled in 100 ml. of methanol and dried at 60° C. Yield: 10.2 g. (93%). Melting point: 127° C.

PREPARATION 6.—1-(m-n-HEXADECYLOXYPHENYL)-3-PHENYLCARBAMOYLAMINO-5-PYRAZOLONE

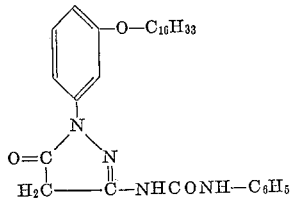

In a three-necked 100 ml. flask provided with a stirrer, a thermometer and a condenser fitted with a drying tube, 9.3 g. (0.02 mole) of 1-(m-n-hexadecyloxyphenyl) - 3-amino-5-pyrazolone, 5.32 g. (0.04 mole) of anhydrous aluminum chloride and 2.40 g. (0.02 mole) of phenyl isocyanate are dissolved in 20 ml. of dry nitrobenzene. After heating for 90 minutes at 50° C., the reaction mixture is poured into 200 ml. of 2 N hydrochloric acid. The resulting precipitate is collected by filtration and recrystallized from hot methanol. Yield: 9.7 g. (93%). Melting point: 179° C.

PREPARATION 7.—1-(m-n-HEXADECYLOXYPHENYL)-3-(2'-THIENYLCARBAMOYLAMINO)-5-PYRAZOLONE

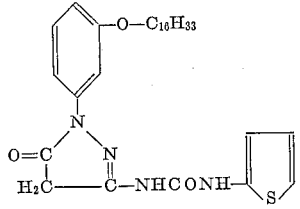

(a) *2-thienoyl azide.*—A solution of 29.3 g. (0.2 mole) of thienoyl chloride (Buu Hoi, Rec. trav. Chim. 68, 19 (1949) in 600 ml. of acetone is cooled down to 5° C. A solution of 14.30 g. (0.22 mole) of sodium azide in 40 ml. of water is added dropwise in 15 minutes. After 30 minutes the turbid reaction mixture is poured into 1800 ml. of ice-water whereupon the formed crystalline product is filtered off and dried in a desiccator on phosphorus pentoxide. Yield: 24.3 g. (79.5%). Melting point: 35° C.

(b) *2-thienyl isocyanate.*—22.95 g. (0.15 mole) of 2-thienoyl azide is dissolved in 300 ml. of anhydrous toluene and refluxed for about 1 hour until the liberation of nitrogen ceases. The solvent is evaporated and the residue distilled. Boiling point: 158°/760 mm. Yield: 12.5 g. (67%).

(c) *1-(m-n-hexadecyloxyphenyl)-3 - (2 - thienylcarbamoylamino)-5-pyrazolone.*—In a 100 ml. flask provided with a stirrer, a thermometer and a condenser fitted with a drying tube, 7.05 g. (0.017 mole) of 1-(m-n-hexadecyloxyphenyl)-3-amino-5-pyrazolone and 4.54 g. (0.034 mole) of anhydrous aluminum chloride are dissolved in 20 ml. of nitrobenzene. To the homogeneous solution is added 2.13 g. (0.017 mole) of 2-thienyl isocyanate whereby the temperature rises from 30 to 45° C. The mixture is kept for 6 hrs. 45 min. at 50° C. and then poured into 100 ml. of 1 N hydrochloric acid. The product is filtered off, washed wtih water and recrystallized from acetic acid. Yield: 5 g. (52%). Melting point: 145–150° C.

PREPARATION 8.—1-(p-n-HEXADECYLSULFONYLPHENYL)-3-THIENYLCARBAMOYLAMINO-5-PYRAZOLONE

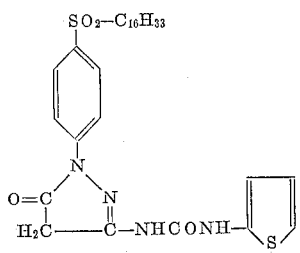

(a) *p-n - Hexadecylmercaptochlorobenzene.*—144.5 g. (1 mole) of p-chlorothiophenol is added to a solution of 64 g. of potassium hydroxyde (88% pure) in 200 ml. of ethanol. To this solution is added 305 g. (1 mole) of n-hexadecyl bromide. The reaction mixture is heated for 15 minutes at 50° C., poured into water and dried. Yield: 250 g. Melting point: 45° C.

(b) *p-n-Hexadecylsulfonylchlorobenzene.*—To a solution of 110.5 g. (0.3 mole) of p-n-hexadecylmercaptochlorobenzene in 750 ml. of acetic acid is added at 80° C. in 20 minutes 200 ml. of hydrogen peroxide (30%). An exothermic reaction takes place, but the reaction temperature is maintained at 90° C. by cooling. After the addition of the hydrogen peroxide the mixture is heated for still 30 minutes at 40° C. Thereupon it is poured into water, and the resulting precipitate is recrystallized from ethanol. Yield: 109 g. Melting point: 65–66° C.

(c) *p-n-Hexadecylsulfonylphenylhydrazine.*—40 g. of p-n-hexadecylsulfonylchlorobenzene (0.1 mole) is boiled for 10 hours with 43 g. of anhydrous hydrazine in 80 ml. of ethyleneglycol monomethylether. By addition of 200 ml. of ethanol and after cooling and filtering, a white product is obtained. Yield: 36 g. Melting point: 100° C.

(d) *1-(p-n-hexadecylsulfonyl)-phenyl - 3 - amino - 5-pyrazolone.*—39.6 g. (0.1 mole) of p-n - hexadecylsulfonylphenylhydrazine is added to a suspension of 19.5 g. of iminoether hydrochloride of cyanoacetic acid ethyl ester in 100 ml. of pyridine. After stirring for 15 minutes at room temperature a solution of 19.2 g. of potassium hydroxide in 150 ml. of ethanol is added. After 15 minutes the obtained solution is diluted with water and neutralized with hydrogen chloride. The formed precipitate is dried at 60° C. and recrystallized from a mixture of equal parts of isopropanol and ethyleneglycol monomethylether. Yield: 30 g. Melting point: 170° C.

(e) *1-(p-n-hexadecylsulfonylphenyl)-3-(2' - thienylcarbamoylamino)-5-pyrazolone.*—

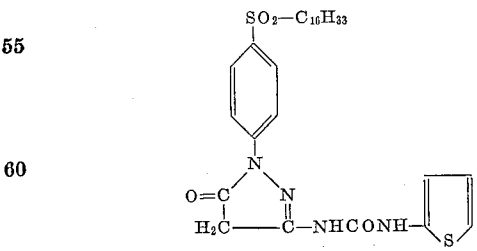

In an outfit as described in Example 7, 9.26 g. (0.02 mole) of 1-(p-n-hexadecylsulfonylphenyl)-3 - amino - 5-pyrazolone and 5.32 g. (0.04 mole) of anhydrous aluminum chloride are dissolved in 20 ml. of nitrobenzene. Then 2.5 g. (0.02 mole) of 2-thienyl isocyanate is added in 2 minutes. The mixture is stirred for 3 hours at 50° C. and poured into 200 ml. of 1 N hydrochloric acid. The greenish precipitate is filtered off, washed with water and recrystallized from acetic acid. Yield: 8 g. (68%). Melting point: 175° C.

PREPARATION 9.—1-(p-n-HEXADECYLSULFONYLPHENYL)-3-(n-BUTYLCARBAMOYLAMINO)-5-PYRAZOLONE

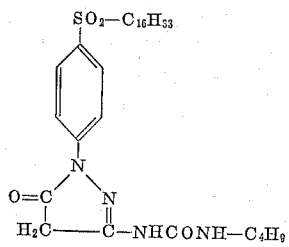

In an outfit as described in the foregoing preparation 9.26 g. (0.02 mole) of 1-(p-n-hexadecylsulfonylphenyl)-3-amino-5-pyrazolone and 5.35 g. (0.04 mole) of anhydrous aluminum chloride are dissolved while stirring in 20 ml. of dry nitrobenzene. After 15 minutes the mixture is homogeneous and at the ambient temperature of 35° C., 2.2 g. (0.02 mole, content 91%) of n-butyl isocyanate is added. The mixture is heated for 2 hours 30 min. at 50° C., whereby hydrogen chloride is liberated. The warm reaction mixture is poured into a mixture of 200 ml. of water and 10 ml. of concentrated hydrochloric acid. The grainy product is sucked off and boiled with 100 ml. of methanol. Yield: 10.7 g. (95%). Melting point: 204° C.

PREPARATION 10.—1 - (p - n - HEXADECYLSULFONYLPHENYL)-3-PHENYLCARBAMOYLAMINO - 5 - PYRAZOLONE

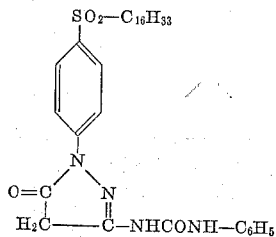

In an outfit analogous to that of preparation 7, 9.26 g. (0.02 mole) of 1-(p-n-hexadecylsulfonylphenyl) - 3-amino-5-pyrazolone, 5.35 g. (0.04 mole) of anhydrous aluminum chloride and 2.4 g. (0.02 mole) of phenyl isocyanate are stirred in 50 ml. of 1,2-dichloroethane. A homogeneous solution is obtained which is heated for 1 hour at boiling temperature and whereby hydrogen chloride is liberated. The reaction mixture is poured into a boiling mixture of 200 ml. of water and 20 ml. of concentrated hydrochloric acid. The formed precipitate is filtered off and recrystallized from dimethylformamide. Yield: 9.2 g. (79%). Melting point: 216° C.

PREPARATION 11.—1 - (p - n - HEXADECYLSULFONYLPHENYL)-3-BENZYLCARBAMOYLAMINO - 5 - PYRAZOLONE

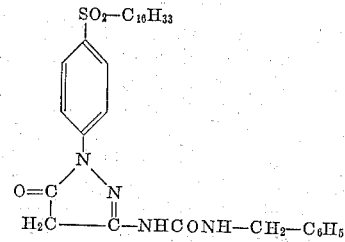

In a 100 ml. flask provided with a stirrer, a thermometer and a condenser fitted with a drying tube, 9.26 g. (0.02 mole) of 1-(p-n-hexadecylsulfonylphenyl)-3-amino-5-pyrazolone and 5.34 g. (0.04 mole) of anhydrous aluminum chloride are dissolved in 20 ml. of nitrobenzene. To this solution is added 2.95 g. (0.02 mole, content: 90%) of benzyl isocyanate; the temperature rises from 25 to 35° C. and hydrogen chloride is liberated. The reaction mixture is further heated for 45 minutes at 50° C. and then decomposed with 150 ml. of 1 N hydrochloric acid. The crude product is filtered off and recrystallized from hot ethanol. Yield: 10.1 g. (85%). Melting point: 193° C.

PREPARATION 12.—1 - (p - n - HEXADECYLAMINOSULFONYLPHENYL) - 3 - (n-BUTYLCARBAMOYLAMINO)-5-PYRAZOLONE

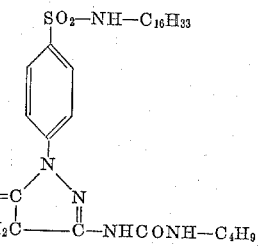

(a) *p-Bromobenzene-(N-n-hexadecyl)-sulfonamide.*—A solution of 255 g. of p-bromobenzene sulfochloride and 241 g. of hexadecylamine in 1 l. of acetone is refluxed with stirring. Then 200 ml. of 5 N sodium hydroxide is added gradually to the slightly boiling solution. The mixture is neutralized with acetic acid and the water layer is separated. By cooling the organic layer a white product is obtained. Yield: 400 g. Melting point: 86° C.

(b) *p - n - Hexadecylaminosulfonylphenylhydrazine.*—A mixture consisting of 230 g. (0.5 mole) of p-bromobenzene-(N-n-hexadecyl)-sulfonamide, 250 ml. of anhydrous hydrazine and 250 ml. of ethyleneglycol monomethylether is refluxed for 25 hours. By diluting the mixture with 500 ml. of methanol a white product is precipitated. Yield: 180 g. Melting point: 112° C.

(c) *1 - (p-n-hexadecylaminosulfonylphenyl) - 3-amino-5-pyrazolone.*—A solution of 41.1 g. (0.1 mole) of p-hexadecylaminosulfonylphenylhydrazine and 19.5 g. (0.1 mole) of β-ethoxy-β-amino acrylic acid ethyl ester hydrochloride in 100 ml. of pyridine is stirred for 15 minutes at room temperature. The mixture is poured into 200 ml. of ethyl acetate. The formed solid is filtered off and stirred for 10 minutes in a hot mixture of 100 ml. of ethanol and 70 ml. of 3 N sodium hydroxide. The solution is diluted with water and neutralized with acetic acid. The pyrazolone compound is collected by filtration and recrystallized from ethylglycol monomethylether. Melting point: 182° C.

(d) *1 - (p-n-hexadecylaminosulfonylphenyl) - 3-(n-butylcarbamoylamino)-5-pyrazolone.*—In an outfit as described in Preparation 3, 8.3 g. (0.04 mole) of antimony (V) fluoride is stirred in 20 ml. of dry nitrobenzene which was previously cooled to 10° C. To the canary-yellow suspension are added portionwise 9.56 g. (0.02 mole) of 1-(p-n-hexadecylaminosulfonylphenyl)-3-amino-5-pyrazolone and 2.2 g. (0.02 mole, content 90%) of n-butyl isocyanate. The mixture is further stirred for 72 hours at room temperature and poured into 200 ml. of 1 N hydrochloric acid. The separated oil is crystallized from 75 ml. of hot methanol. Yield: 10.5 g. (91%). Melting point: 189° C.

PREPARATION 13.—1 - (p - n - HEXADECYLSULFONYLPHENYL) - 3 - (p-FLUOROSULFONYLPHENYLCARBAMOYLAMINO)-5-PYRAZOLONE

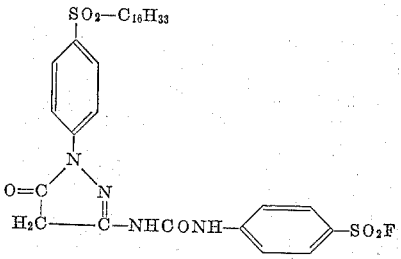

(a) *p-Fluorosulfonylphenyl isocyanate.*—The synthesis is analogous to that of p-nitrophenyl isocyanate (Org. Synth. Coll., vol. II, 453).

To 500 ml. of dry ethyl acetate, which is saturated with carbonyl chloride, a solution of 175 g. (1 mole) of p-fluorosulfonylaniline in 1500 ml. of dry ethyl acetate is added dropwise in a period of 90 minutes. During the reaction a slow stream of carbonyl chloride is passed through the mixture. After 2 hours the solvent is evaporated under nitrogen at atmospheric pressure. The residue is distilled in vacuo. Yield: 186.4 g. (93%). Boiling point: 100–102° C./0.6–0.8 mm.

(b) *1 - (p-n-hexadecylsulfonylphenyl) - 3-(p-fluorosulfonylphenylcarbamoylamino) - 5 - pyrazolone.*—12.4 g. (0.06 mole) of antimony(V) fluoride is added to 20 ml. of nitrobenzene which was cooled in ice-water. To the obtained yellow suspension are added 13.9 g. (0.03 mole) of 1-(p-n-hexadecylsulfonylphenyl)-3-amino-5-pyrazolone and 6.0 g. (0.03 mole) of p-fluorosulfonylphenyl isocyanate. The mixture is stirred for 72 hours at room temperature and poured into 150 ml. of diluted hydrochloric acid. After keeping overnight, the oil is solidified to a grainy product. It is crystallized from 200 ml. of methanol. Yield: 17.1 g. (86%). Melting point: 228° C.

PREPARATION 14.—1 - (p - n - HEXADECYLAMINOSULFONYLPHENYL) - 3 - NAPHTHYLCARBAMOYLAMINO-5-PYRAZOLONE

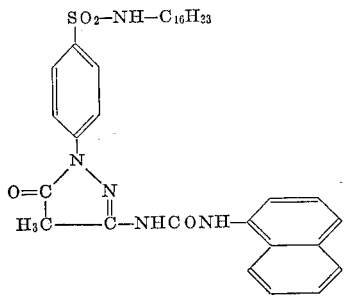

Analogously to the process described in Preparation 12, 9.56 g. (0.02 mole) of 1-(p-n-hexadecylaminosulfonylphenyl)-3-amino-5-pyrazolone, 3.4 g. (0.02 mole) of α-naphthyl isocyanate are brought into reaction in a mixture of 8.3 g. (0.04 mole) of antimony(V) fluoride and nitrobenzene. Yield: 9.2 g. (71.5%). Melting point: 208° C.

PREPARATION 15.—1 - [p-(N-n-HEXADECYL-N-PHENYL-CARBAMOYLSULFAMOYL) - PHENYL] - 3 - PHENYLCARBAMOYLAMINO-5-PYRAZOLONE

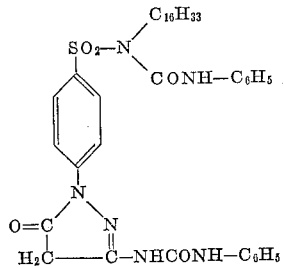

In a 100 ml. flask 9.56 g. (0.02 mole) of 1-(p-n-hexadecylaminosulfonylphenyl)-3-amino-5-pyrazolone and 8 g. (0.06 mole) of anhydrous aluminum chloride are dissolved in 20 ml. of dry nitrobenzene while stirring. To this reaction mixture 4.8 g. (0.04 mole) of phenyl isocyanate is added dropwise, thus causing the liberation of hydrogen chloride. The mixture is heated for 5 hours at 50° C. and poured into a mixture of 200 ml. of water and 10 ml. of concentrated hydrochloric acid. The formed precipitate is filtered off, boiled in 100 ml. of methanol, separated and recrystallized from a mixture consisting of 100 ml. of ethanol and 25 ml. of ethyleneglycol monomethylether. Yield: 9.1 g. (68%). Melting point: 190° C.

PREPARATION 16.—1 - (p - n - HEXADECYLAMINOSULFONYLPHENYL) - 3 - PHENYLCARBAMOYLAMINO-5-PYRAZOLONE

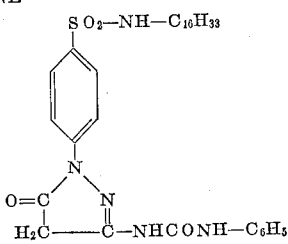

In a dry 100 ml. flask provided with a stirrer, a thermometer and a condenser fitted with a drying tube, are placed 30 ml. of dry nitrobenzene and 12.4 g. (0.06 mole) of antimony(V) fluoride. A yellow suspension is obtained which is cooled in ice. Then 14.35 g. (0.03 mole) of p-(1-n-hexadecylaminosulfonylphenyl)-3-amino-5-pyrazolone and 3.57 g. (0.03 mole) of phenyl isocyanate are added. The mixture is heated for 4 hours at 50° C., and poured into 100 ml. of 1 N hydrochloric acid. The sticky product is allowed to stand overnight and so becomes well granulated. The crude product is filtered off and boiled in 200 ml. of methanol. Yield: 13.8 g. (77%). Melting point: 235° C.

B. *Reaction with isothiocyanates*

PREPARATION 1.—1-PHENYL-3-PHENYLTHIOCARBAMOYLAMINO-5-PYRAZOLONE

In a 100 ml. flask provided with a stirrer, a thermometer and a condenser fitted with a drying tube 8.75 g. (0.05 mole) of 1-phenyl-3-amino-5-pyrazolone and 13.35 g. (0.1 mole) of anhydrous aluminum chloride are dissolved in 25 ml. of dry nitrobenzene. To the homogeneous solution which is cooled to 10° C., 6.75 g.

(=6 ml.=0.05 mole)

of phenylisothiocyanate is added. The reaction mixture is stirred for 18 hours at room temperature and poured into 1 N hydrochloric acid. The precipitate is boiled in 100 ml. of methanol, filtered off and dried. Yield: 9.7 g. (64.5%). Melting point: 218° C.

PREPARATION 2.—1-PHENYL-3-METHYLTHIOCARBAMOYLAMINO-5-PYRAZOLONE

In an outfit as described in Preparation 1, 17.5 g. (0.1 mole) of 1-phenyl-3-amino-5-pyrazolone is dissolved in a solution of 27 g. (0.2 mole) of anhydrous aluminum chloride and 20 ml. of nitrobenzene. To this mixture 7.3 g. (0.1 mole) of methyl isothiocyanate is added at 20° C. After stirring for 24 hours at room temperature, the mixture is poured into 2 N hydrochloric acid. The resulting solid is filtered off and boiled in methanol. Yield: 20.1 g. (81%). Melting point: 240° C.

We claim:

1. In the process of preparing 3-carboxylic acid acylamino-5-pyrazolones and 3-ureido-5-pyrazolones comprising the reaction of 3-amino-5-pyrazolones and a compound selected from the group consisting of acid chlorides, acid anhydrides, organic isocyanates, and organic isothiocyanates, the improvement wherein the reaction is carried out in an anhydrous inert solvent selected from the group consisting of nitrobenzene, tetrahydrothiophene-1, 1-dioxide, nitromethane and chlorinated lower aliphatic hydrocarbons in the presence of a member of the group consisting of aluminum chloride, tin(IV) chloride, antimony(V) fluoride and zinc chloride.

2. In the process of preparing 3-carboxylic acid acylamino-5-pyrazolones and 3-ureido-5-pyrazolones comprising the reaction of 3-amino-5-pyrazolones and a compound selected from the group consisting of acid chlorides, acid anhydrides, organic isocyanates, and organic isothiocyanates, the improvement wherein the reaction is carried out in an anhydrous inert solvent selected from the group consisting of nitrobenzene, tetrahydrothiophene-1, 1-dioxide, nitromethane and chlorinated lower aliphatic hydrocarbons in the presence of a member of the group consisting of aluminum chloride, tin(IV) chloride, antimony(V) fluoride and zinc chloride.

3. In the process of preparing 3-ureido-5-pyrazolones comprising reacting 3-amino-5-pyrazolones with a compound selected from the group consisting of organic isocyanates and organic isothiocyanates, the improvement wherein the reaction is carried out in an anhydrous inert solvent selected from the group consisting of nitrobenzene, tetrahydrothiophene-1, 1-dioxide, nitromethane and chlorinated lower aliphatic hydrocarbons in the presence of a member of the group consisting of aluminum chloride, tin(IV) chloride, antimony(V) fluoride and zinc chloride.

4. In the process of preparing 3-carboxylic acid acylamino-5-pyrazolones comprising reacting 3-amino-5-pyrazolones with a compound selected from the group consisting of acid chlorides and acid anhydrides, the improvement wherein reaction is carried out in an anhydrous inert solvent selected from the group consisting of nitrobenzene, tetrahydrothiophene-1, 1-dioxide, nitromethane and chlorinated lower aliphatic hydrocarbons in the presence of a member of the group consisting of aluminum chloride, tin(IV) chloride, antimony(V) fluoride and zinc chloride.

5. The process of claim 1 wherein the reaction is carried out at a temperature below the boiling point of the inert solvent.

6. The process of claim 1 wherein the inert solvent is nitrobenzene.

7. The process of claim 1 wherein the inert solvent is 1,2-dichloroethane.

8. The process of claim 2 wherein the Friedel Crafts catalyst is anhydrous aluminum chloride.

9. The process of claim 2 wherein the Friedel Crafts catalyst is antimony(V) fluoride.

References Cited
UNITED STATES PATENTS 2,369,489   2/1945   Porter et al. _____ 260—249.9 X

OTHER REFERENCES

Fieser et al.: "Organic Chemistry," 2nd edition, page 140, D. C. Heath and Co., Boston (1950).

Olah: Friedel Crafts and Related Reactions, vol. III, part 1, pages 568, 884, 890 and 892, and part 2, pages 955, 991 and 993, Interscience Publishers, Inc., New York, 1965.

Thomas: Anhydrous Aluminum Chloride in Organic Chemistry, pages 381–383, Reinhold Pub. Corp., New York (1941).

Weissberger et al.: J. Am. Chem. Soc., vol. 64, pages 2133 to 2136 (1942).

JOHN D. RANDOLPH, *Primary Examiner.*